Figure 1:
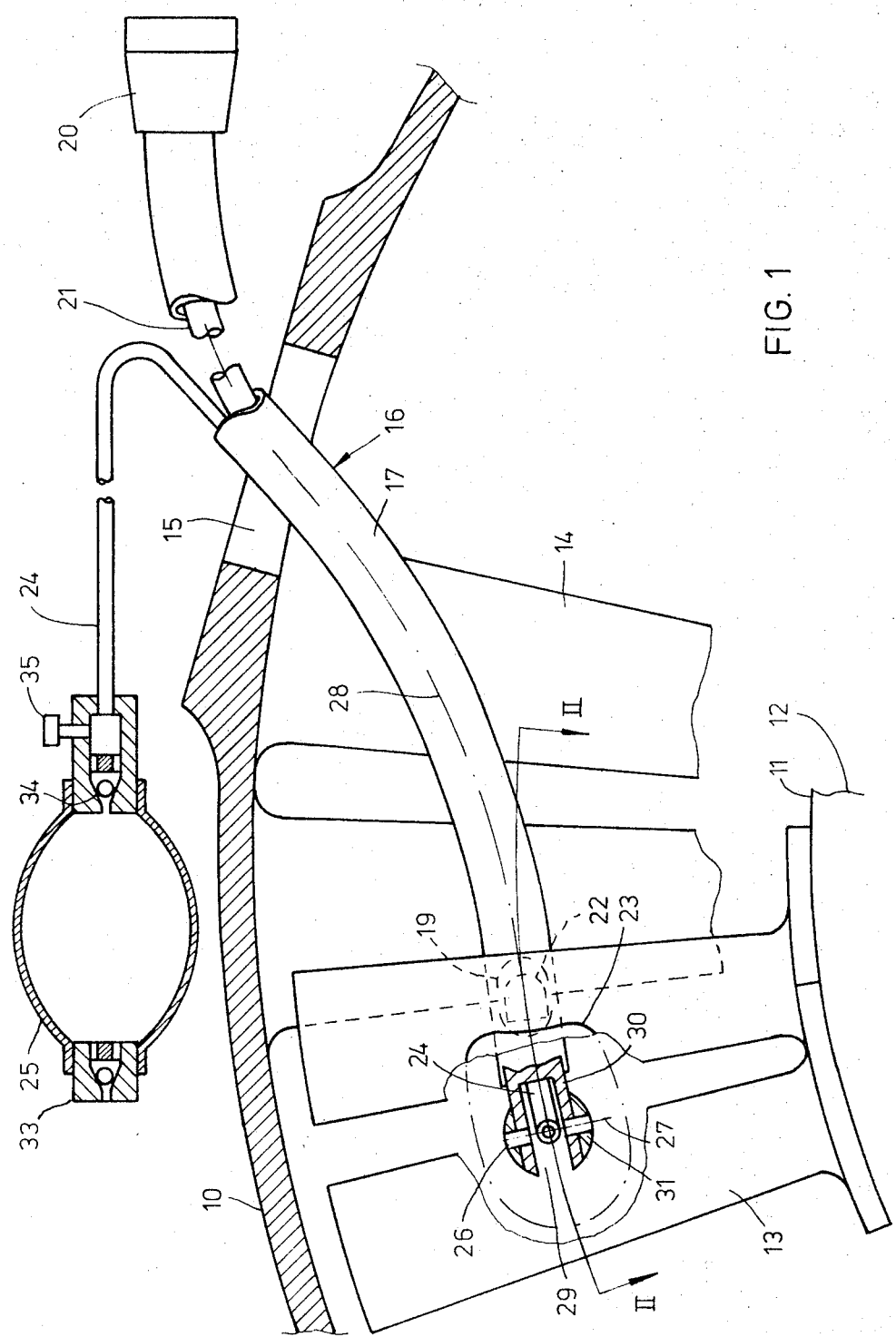

United States Patent [19]

Snell et al.

[11] 3,841,764

[45] Oct. 15, 1974

[54] INTRASCOPE

[75] Inventors: Leonard Stanley Snell; William Edward Dennis Vivian, both of Alveston, England

[73] Assignee: The Secretary of State for Defence in Her Britannic Majesty's Government of the United Kingdom of Great Britain and Northern Ireland, London, England

[22] Filed: July 5, 1972

[21] Appl. No.: 269,072

Related U.S. Application Data

[62] Division of Ser. No. 92,123, Nov. 23, 1970, abandoned.

[30] Foreign Application Priority Data

Sept. 12, 1969  Great Britain.................... 59955/69

[52] U.S. Cl. .............................................. 356/241
[51] Int. Cl. ........................................... G01n 21/16
[58] Field of Search............ 350/96 B, 320; 356/237, 356/241

[56] References Cited

UNITED STATES PATENTS

| 3,690,775 | 9/1972 | Cousins............................. 356/241 |
| 3,759,151 | 9/1973 | Metz................................. 356/241 |

*Primary Examiner*—William L. Sikes
*Attorney, Agent, or Firm*—Stevens, Davis, Miller & Mosher

[57] ABSTRACT

The disclosure of this invention pertains to an intrascope provided at the objective end with a fastening device whereby the intrascope may be pulled from within the cavity to be inspected. The fastening device is an inflatable bag which can be lodged between two adjacent rotor blades of a turbine so that by turning the turbine the intrascope can be pulled into the turbine casing for inspection of stator blades.

1 Claim, 2 Drawing Figures

INTRASCOPE

This is a division, of application Ser. No. 92,123, filed Nov. 23, 1970, now abandoned.

This invention relates to intrascopes.

It is known to provide intrascopes in the form of a flexible light guide which can be inserted into a confined space for inspection of structure not normally accessible to view. An example of such use is found in gas turbine engines where it is required to inspect the interior of the engine from a position outside a casing enclosing the engine. Where the inspection is to be of stator blades of a turbine of the engine there is the difficulty of having to feed the intrascope into the confined space between the stator blades and adjacent rotor blades. The main object of this invention is to provide an intrascope which will facilitate such inspection operations.

According to this invention there is provided an intrascope comprising a flexible elongate light guide, a fastening device secured at one end of the light guide and operable to attach that end to an adjacent structure, an operating device for the fastening device connected to the light guide in the proximity of the other end thereof, and flexible elongate means connected to the light guide along the length thereof for transmitting motion between the operating member and the fastening device for the operation thereof.

Referring to the example of the gas turbine, the fastening device makes it possible to attach the one end of the light guide to the turbine blades which can then be moved to feed the light guide along the stator blades for the inspection thereof.

Figure 2:
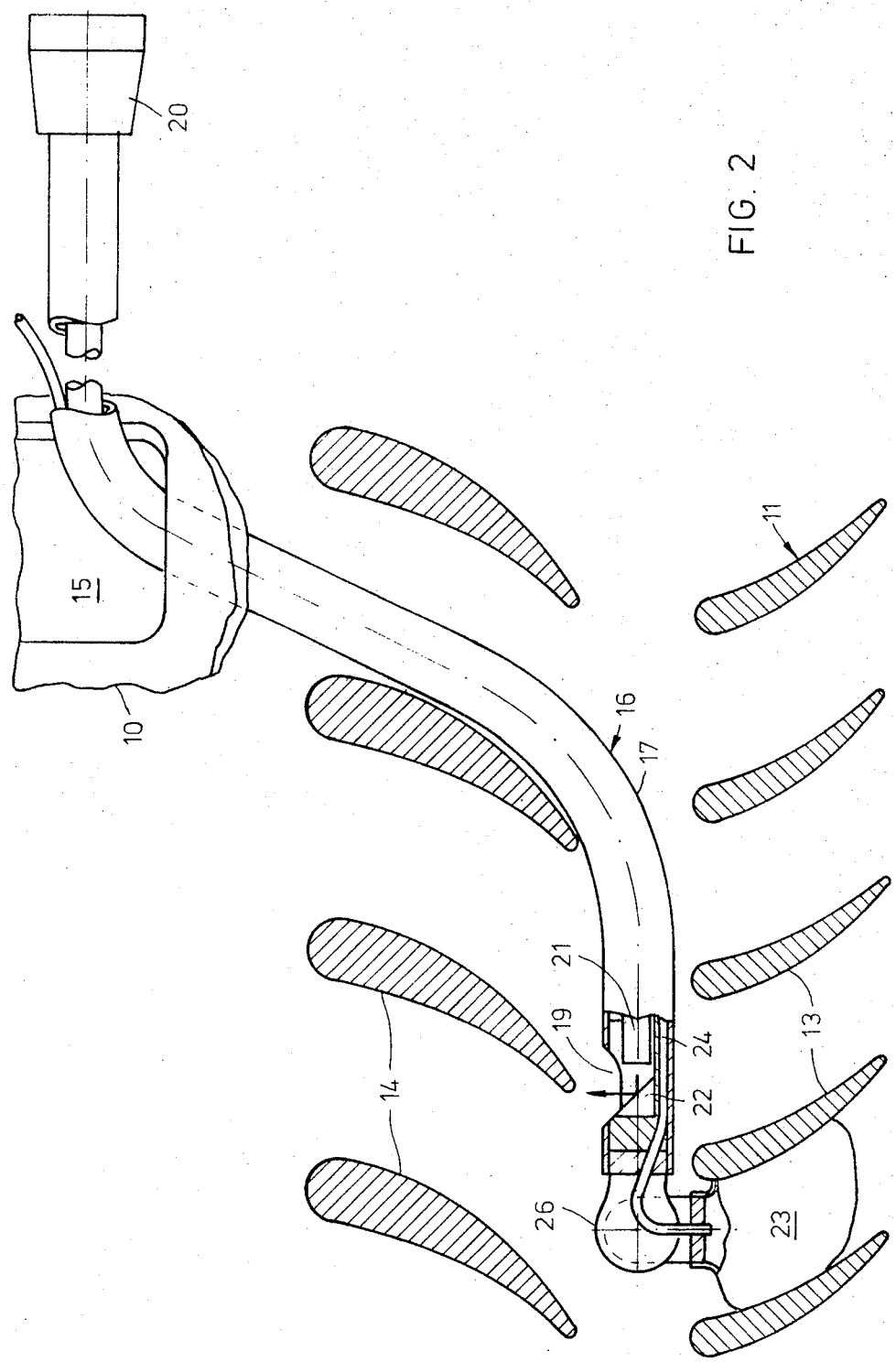

An example of the invention will now be described with reference to the accompanying drawings wherein:

FIG. 1 is a sectional end view of a representative portion of a turbine of a gas turbine engine; and FIG. 2 is a section on the line II—II in FIG. 1.

Referring to the drawings, the turbine comprises a casing 10 in which is supported for rotation a rotor 11 having a body 12 supporting turbine blades 13. Adjacent the rotor there is the usual stator comprising blades 14 secured to the casing 10.

The casing 10 comprises an opening 15 for the introduction of an intrascope 16 which comprises a flexible sheath 17 provided at one end, the objective end, with a lateral light receiving aperture 19 and at the other end with an eye-piece 20. The body 17 includes a fibre-optic light guide 21 connected between the eye-piece 20 and a mirror 22 set at 45° to the axis of the guide 21 so as to make it possible for the guide 21 to receive and transmit light through the aperture 19.

The intrascope includes at the objective end thereof an inflatable rubber bag 23 of a dimension suitable for being inserted between two adjacent rotor blades 13 while at least partially deflated and being held in position between the blades by being inflated. For the purpose of inflation and deflation the bag 23 is connected by a pipe 24 to a squeeze pump 25 at the eye-piece end of the intrascope. The bag 23 is connected to the body 17 by a pivotal joint 26 for purposes to be explained.

The light guide 21, besides comprising fibres connected to the eye-piece 20, may also include fibres for the transmission of light from a light source (not shown) to the mirror 22 for illuminating the object to be viewed.

In use, the bag 23 is inserted by an operator through the opening 15 into position between two adjacent blades 13 and is inflated to become lodged between these blades. It will be noted in FIG. 2 that in the present example the opening 15 is situated so that the bag has to be passed first through between the stator blades 14 before it reaches the rotor blades, and a certain amount of manipulation or wriggling of the sheath 17 may be necessary, accompanied by slight turning to and fro of the rotor, to make it possible to position the bag 23 correctly. In this connection the pivotal joint 26 makes it possible for the assembly of the body 17 and bag 23 to accommodate itself to the difference in the angle between the blades 13 and 14.

The body 17 is so positioned by the operator that the aperture 19 faces the adjacent edge of the nearest blades 14 and the operator can do this simply by turning the body 17 about its own axis until he obtains a satisfactory image in the eye-piece. Thereafter the aperture 19 is moved from one blade 14 to the next simply by another operator turning the rotor accordingly.

The pivotal joint 26 is situated in alignment with the light guide and the bag 23 can be pivoted into such alignment so that the assembly is comparatively slender and can be passed through confined spaces, e.g., between two adjacent blades 14, towards the operative position. This alignment of light guide, pivot and bag is achieved by situating the joint 26 so that the pivot axis 27 intersects the axis 28 of the light guide at right angles.

The pivot joint 26 is so constructed that a space 29 is left inside the joint 26 in the position of the axis 28 of the light guide. To this end the joint comprises two members 30, 31 respectively connected to the light guide 21 and to the bag 23 and situated to one side of the axis 28. This provides space for the passage of the pipe 24 from the sheath 17 to the bag, see FIG. 2. Also the space 29 provides for the possibility of using the intrascope for viewing forwards, i.e. in the direction of the axis 28, instead of at right angles thereto.

The squeeze pump comprises a rubber bulb 32 having inlet and outlet valves 33, 34 for pumping up the bag 23 and a relief valve 35 for emptying the bag when the intrascope has to be removed.

The light guide is not specifically described as such guides are well known per se.

We claim:

1. The method of inspecting by use of an intrascope a machine comprising a rotor having a body supported for rotation and blades connected to said body; a casing surrounding the body and blades, said casing having an opening therein for access to said blades; said intrascope comprising a flexible elongate light guide, a viewing objective provided at one end of the light guide, and means for holding said one end of the light guide between said blades; said method comprising the steps of inserting the intrascope through said opening,
holding said one end of the intrascope between said blades, and
turning said rotor about the rotational axis thereof thereby to feed the intrascope into the interior of the casing for inspection of said machine.

* * * * *